Dec. 26, 1967  C. D. LINDBERG  3,360,423
FLEXIBLE STRUCTURAL FOAM SANDWICH CONSTRUCTION
Filed Sept. 21, 1961
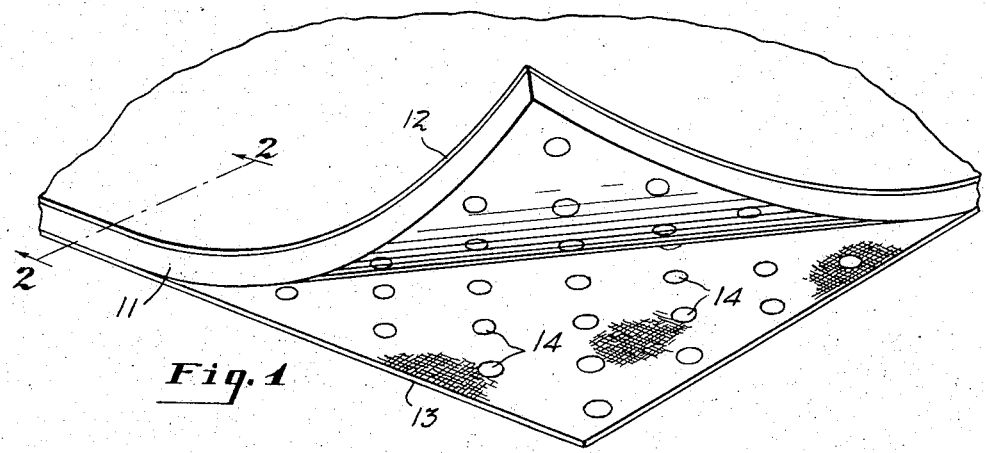
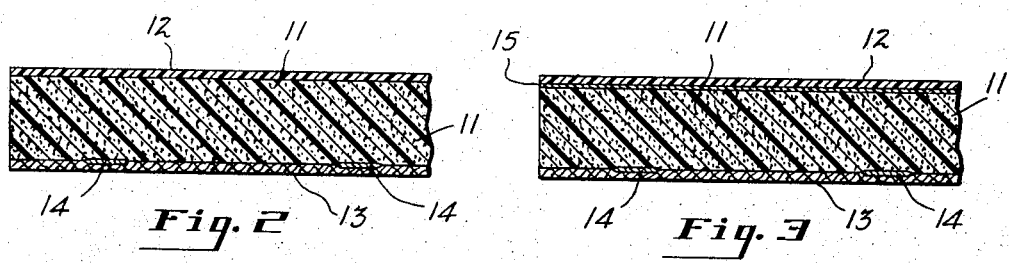
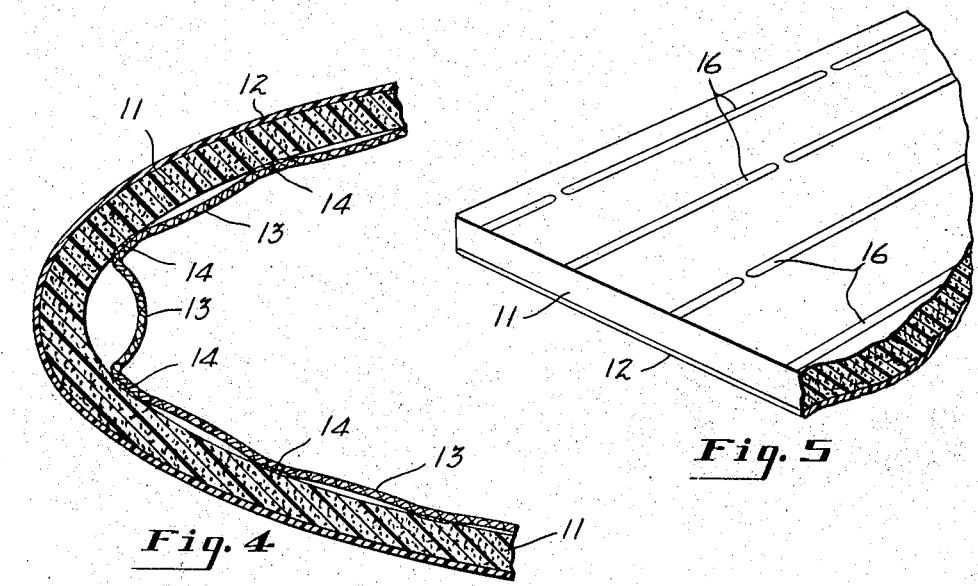
INVENTOR
Charles D. Lindberg
BY McCoy, Greene + Te Groten Luis
ATTORNEYS United States Patent Office 3,360,423
Patented Dec. 26, 1967

3,360,423
FLEXIBLE STRUCTURAL FOAM SANDWICH CONSTRUCTION
Charles D. Lindberg, Cuyahoga Falls, Ohio, assignor to The General Tire & Rubber Company, Akron, Ohio, a corporation of Ohio
Filed Sept. 21, 1961, Ser. No. 139,685
2 Claims. (Cl. 161—148)

This invention relates to a multi-layered article consisting essentially of a flexible structural foam sheet having adhered to one side a flexible sheet of plastic and having adhered discontinuously to the other side of a flexible backing material.

The use of flexible plastic sheeting for furniture upholstery material has become commercially successful because of the abrasion resistance, color retention, ease of care, impermeability to liquids and flexibility retention of the plastics employed. Some of the higher grades of plastic upholstery are composed of layers. The first layer is the flexible sheet of plastic which is visible on upholstered furniture. This plastic is backed by a thin layer of loose randomly arranged fibers. The surface portions of the fibers are bonded to the flexible sheet and give it body as well as reinforcement. Attempts have been made to adhere the flexible plastic sheet to a light flexible foam sheet in place of the fibrous layer. The foam is adhered to the plastic generally by using a cement or by a calendering operation. Since the foam as well as the plastic sheet should have limits placed on the stretch by fibrous material, the foam sheet then should be backed by a woven fibrous sheet, which is adhered to the foam by a cement.

Flexible structural foams have one characteristic which is peculiar to foams because of their structure and which is not appurtenant to randomly arranged fibers in that the surface of the upholstery retains its original appearance because the foam does not pack as do loose random fibers. However, when an upholstery composite of plastic sheet, foam and woven or non-woven fibrous sheet backing was heretofore made with the three elements cemented together, the composite had a stiff boardy feel or hand and was not desirable. This boardy feel is not appreciable for the foam alone attached to the plastic sheet, but as the foam is reinforced as by a backing, its resistance to bending increases. Elimination of backing is not a commercially practical solution because limits to undesired stretch and resistance to tearing are not maintained.

One of the objects of this invention is to provide a composite material suitable for use as upholstery for cushions having the advantages of the composite of an upper flexible plastic sheet but remaining flexible and having a pleasing hand. Other objects will be apparent from the following description of the invention.

This invention relates to an article of manufacture comprising essentially a flexible structural foam sheet ranging in thickness from about 0.05 inch to about ¼ inch to both sides of which are adhered flexible, coextensive backing sheets at least one of which backing sheet is adhered discontinuously to the foam sheet and one of which is fibrous to provide limits on stretch and reinforcing against tear.

In the preferred embodiment of this invention one backing sheet is a plastic which ultimately appears as the outer covering in upholstered furniture. This plastic sheet can be adhered continuously or discontinuously to the foam as desired but is generally adhered continuously by a calendering operation or use of a layer of cement. The other backing sheet can be any flexible material, usually a fabric, and must be adhered discontinuously to the foam.

This invention is more easily understood by reference to the accompanying drawing.

FIGURE 1 is an isometric view of a partially dismantled article of this invention.

FIGURE 2 is a section as viewed from a plane through the line 2—2 in FIGURE 1 looking in the direction of the arrows.

FIGURE 3 is a section of another typical composite article of this invention.

FIGURE 4 is a section of the article depicted in FIGURE 2 under bending stress.

FIGURE 5 is an isometric section of foams with cementitious material distributed in discontinuous stripes on the surface thereof.

In FIGURE 1 a foam sheet 11 has adhered to its sides flexible, coextensive backing sheets 12 and 13. As shown backing sheet 12 has been secured by calendering foam 11 and sheet 12 together whereas backing sheet 13 is secured by a discontinuous layer of a cement distributed in spots.

In FIGURE 2 a foam sheet 11 has adhered to its sides flexible, coextensive backing sheets 12 and 13. While backing sheet 13 is adhered to the foam sheet 11 by a discontinuous cement layer 14 as in FIGURE 1, backing sheet 12 has been calendered with foam sheet 11 thereby eliminating the need for any cement. In the preferred embodiment of this invention backing sheet 12 is a plastic.

In FIGURE 3 backing sheet 13 is adhered to foam sheet 11 by a discontinuous cement layer 14 while backing sheet 12 is adhered to foam sheet 11 by a continuous cement layer 15. Generally, the continuous cement layer 15 can be replaced by a discontinuous cement layer 14.

In FIGURE 4 the embodiment depicted in FIGURE 2 is shown under bending stress. The freedom of the backing sheet 13 to buckle is believed to be at least one of the principal factors in rendering the composite article satisfactorily flexible.

In FIGURE 5 a cement 16 has been applied in stripes to the surface of a foam sheet 11 prior to application of a backing sheet. However, the cement can be applied in circles, squares or odd shapes as well as the stripes and dots illustrated by spraying, rolling, screening or brushing the cement while in a fluid state.

Typical foams which can be employed in the articles of this invention include, for example, flexible polyurethane foams including the polyether-urethane and polyester-urethane foams and latex sponge rubber and silicone rubber foams all of which are commercially available. The polyurethane foams are preferred. For the objects of this invention it is preferably that the foam sheet have a thickness of no more than about 0.25 inch although some flexible foam sheets can be employed in thicknesses up to about 0.5 or even one inch.

Any of the common flexible fibrous backing sheets can be employed such as, for example, paper, knit and square woven fabrics and non-woven fabrics. The preferred plastics are any of the plasticized and stabilized polymers and copolymers of vinyl chloride, vinyl acetate and vinylidene chloride, but the plastic can be polypropylene, poly (ethylene-propylene) polyethylene or any flexible or rubbery material including flexible resinous silicone compositions, neoprene compositions and plastic fabrics. Preferably, the plastic sheet ranges in thickness from about 0.003 inch to about 0.1 inch depending on its physical characteristics in order to be adequately flexible and sufficiently strong.

The cement used should be one that sets to a relatively hard non-plastic state. There are many suitable commercially available cements, e.g., epoxy or epon cements such as, for example, that made from bisphenol A and epichlorohydrin hardened with an amine catalyst.

The composite articles of this invention are especially useful for upholstery. The intermittent or spotty bonding of the fibrous backing gives an especially desirable hand to the composite fabric and eliminates the boardy feel made with prior composites wherein a continuous cement is used to bond the foam to the plastic sheet and to the fibrous backing layer.

What we claim is:

1. An upholstery material consisting essentially of a flexible polyurethane foam sheet ranging in thickness from about 0.05 inch to about one-quarter inch, one side of said foam sheet being adhered to a flexible polyvinyl plastic sheet coextensive with said foam sheet and ranging in thickness from about 0.003 inch to about 0.1 inch and the other side of said foam sheet being adhered by a discontinuous layer of a cement to a fabric backing coextensive with said foam sheet.

2. An article of manufacture consisting essentially of a flexible structural foam sheet ranging in thickness from about 0.05 inch to about one-quarter inch, one side of said foam sheet being adhered to a flexible coextensive sheet of synthetic resin and the other side of said foam sheet being adhesively bonded to a flexible coextensive backing sheet at a multiplicity of small areas spaced apart throughout the length and width of the foam sheet.

References Cited

UNITED STATES PATENTS

| | | | |
|---|---|---|---|
| 2,999,041 | 9/1961 | Lappala | 161—49 |
| 2,981,954 | 5/1961 | Garbellano | 2—2.1 |
| 798,313 | 9/1905 | Alexander | 156—291 |
| 2,164,499 | 7/1939 | Coughlin | 154—46 |
| 2,518,762 | 8/1950 | Draheim | 156—291 |
| 2,878,153 | 3/1959 | Hacklander | 154—54 |
| 2,946,713 | 7/1960 | Dusina et al. | 156—219 |
| 2,962,406 | 11/1960 | Rosa | 156—219 |
| 3,093,525 | 6/1963 | Wilson et al. | 156—79 |
| 3,251,727 | 5/1966 | Reynolds et al. | 161—148 |
| 3,257,262 | 6/1966 | Epstein | 161—89 |

FOREIGN PATENTS

| | | |
|---|---|---|
| 1,241,226 | 8/1960 | France. |

EARL M. BERGERT, *Primary Examiner.*

H. F. EPSTEIN, *Assistant Examiner.*